(12) United States Patent
Kim et al.

(10) Patent No.: US 11,107,459 B2
(45) Date of Patent: Aug. 31, 2021

(54) ELECTRONIC APPARATUS, CONTROLLING METHOD AND COMPUTER-READABLE MEDIUM

(71) Applicant: SAMSUNG ELECTRONICS CO., LTD., Suwon-si (KR)

(72) Inventors: Eunseo Kim, Suwon-si (KR); Jaehyun Bae, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 234 days.

(21) Appl. No.: 16/291,648

(22) Filed: Mar. 4, 2019

(65) Prior Publication Data

US 2019/0272819 A1    Sep. 5, 2019

(30) Foreign Application Priority Data

Mar. 2, 2018 (KR) .................... 10-2018-0025300

(51) Int. Cl.
*G10L 15/04* (2013.01)
*G10L 15/28* (2013.01)
*G10L 15/187* (2013.01)

(52) U.S. Cl.
CPC ............ *G10L 15/04* (2013.01); *G10L 15/187* (2013.01); *G10L 15/285* (2013.01)

(58) Field of Classification Search
CPC ...... G10L 15/04; G10L 15/187; G10L 15/285
See application file for complete search history.

(56) References Cited

U.S. PATENT DOCUMENTS

| 9,099,082 | B2 | 8/2015 | Kim et al. |
| 9,779,730 | B2 | 10/2017 | Hong et al. |
| 2009/0063460 | A1* | 3/2009 | Selberg ............... G06F 16/9535 |
| 2015/0248454 | A1* | 9/2015 | Muraoka ............. G06F 16/2425 |
| | | | 707/727 |
| 2016/0027437 | A1 | 1/2016 | Hong et al. |
| 2016/0034458 | A1 | 2/2016 | Choi et al. |

FOREIGN PATENT DOCUMENTS

| CN | 107195296 A | 9/2017 |
| JP | 5180800 B2 | 4/2013 |
| JP | 2016-11995 A | 1/2016 |
| JP | 2016-164724 A | 9/2016 |

(Continued)

OTHER PUBLICATIONS

Search Report dated Jun. 13, 2019, issued by the International Searching Authority in International Application No. PCT/KR/2019/002466 (PCT/ISA/210).

(Continued)

*Primary Examiner* — Sonia L Gay
(74) *Attorney, Agent, or Firm* — Sughrue Mion, PLLC

(57) ABSTRACT

An electronic device is disclosed. The electronic device includes a memory configured to store a pronunciation dictionary including a plurality of words; and a processor configured to: obtain a second word based on a first word of the plurality of words; obtain a first text corpus related to the first word through web crawling of the first word and a second text corpus related to the second word through web crawling of the second word; and verify the second word based on a result of comparison of the first text corpus and the second text corpus.

20 Claims, 9 Drawing Sheets

(56) References Cited

FOREIGN PATENT DOCUMENTS

| | | |
|---|---|---|
| JP | 6121187 B2 | 4/2017 |
| KR | 10-1394253 B1 | 5/2014 |
| KR | 10-2016-0013710 A | 2/2016 |
| KR | 10-2016-0061071 A | 5/2016 |
| KR | 10-2017-0107283 A | 9/2017 |

OTHER PUBLICATIONS

Written Opinion dated Jun. 13, 2019, issued by the International Searching Authority in International Application No. PCT/KR/2019/002466 (PCT/ISA/237).

* cited by examiner

FIG. 5

TEXT CORPUS FOR "액세스" (510)

| |
|---|
| DATA ACCESS ? SEARCH RESULT BY ACCESSING DATA...... |
| ACCESS VIDEO LECTURE VIDEO LECTURE FOR COMPUTER PROGRAM GUIDE ? 2017.1.1 PM 2:00 ...... |
| ... |

DATA ACCESS
SEARCH RESULT
DATA ACCESS
...

TEXT CORPUS FOR "억세스" (520)

| |
|---|
| SUSPENSE NOVEL ? A VOL.1, 억! WHERE ARE WE NOW? WHO ARE YOU?!...... |
| PLEASE LET ME KNOW DIFFERENCE BETWEEN SUPENSE AND THRILLER ? ANSWER FOR QUESTION...... |
| ... |

서스펜스 SUSPENSE
NOVEL VOL.1
억
...

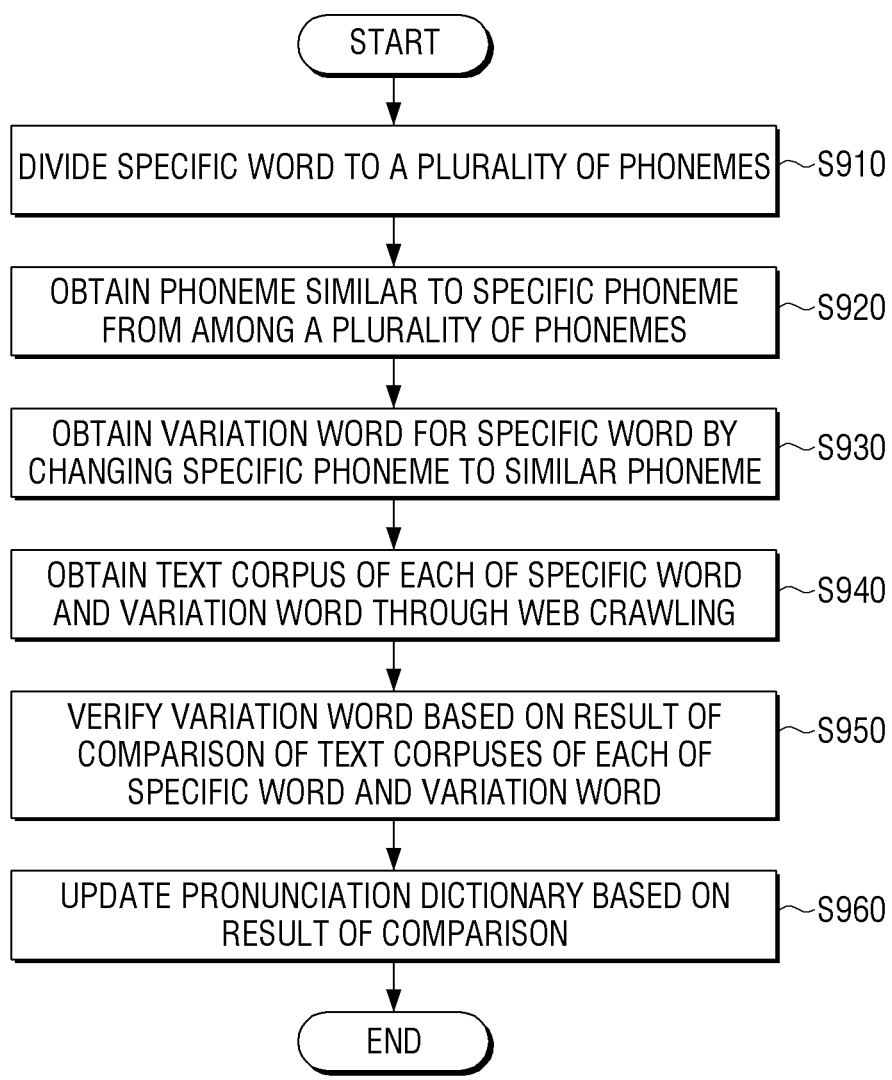

ELECTRONIC APPARATUS, CONTROLLING METHOD AND COMPUTER-READABLE MEDIUM

CROSS-REFERENCE TO RELATED APPLICATION

This application is based on and claims priority under 35 U.S.C. § 119(a) to Korean Patent Application number 10-2018-0025300, filed on Mar. 2, 2018, in the Korean Intellectual Property Office, and the disclosure of which is incorporated by reference herein in its entirety.

BACKGROUND

1. Field

The disclosure relates to an electronic device, a controlling method, and a recording medium. more particularly, to an electronic device which obtains a variant word using a plurality of words pre-stored in a pronunciation dictionary that is used for voice recognition, and on the basis of a text corpus established through the web crawling on the obtained variant word, stores the variant word in a pronunciation dictionary, a controlling method thereof, and a recording medium.

2. Description of Related Art

A conventional method for recognizing voice through an electronic device may include the steps of signal-processing of a user's voice, extracting features of the processed voice, extracting a phoneme using the extracted features and an acoustic model, combining words using the phoneme extracted by using a language model, and matching the words with a specific meaning or a word through a pre-stored pronunciation dictionary.

In such conventional method, when a word spoken is pronounced slightly different from a commonly accepted pronunciation of the word, the spoken word may not be recognized solely based on the pre-learned or pre-stored data through a language model and a pronunciation dictionary.

In addition, the conventional method has difficulty in changing a learning structure or a result of the language model because in order to do so, the structure of a voice recognizer needs to be changed. A method of generating an updated or new pronunciation dictionary has an additional disadvantage in that the method may require the know-how or expert knowledge to generate the updated or new pronunciation dictionary.

SUMMARY

An aspect of various embodiments of the present disclosure is to provide a method for obtaining a variant word having a similar pronunciation with a plurality of words pre-stored in a pronunciation dictionary and a method for verifying and storing the variation, and a pronunciation dictionary which may be automatically updated in order to increase the accuracy of voice recognition.

According to an aspect of the disclosure, there is provided an electronic device including: a memory configured to store a pronunciation dictionary including a plurality of words; and a processor configured to: obtain a second word based on a first word of the plurality of words; obtain a first text corpus related to the first word through web crawling of the first word and a second text corpus related to the second word through web crawling of the second word; and verify the second word based on a result of comparison of the first text corpus and the second text corpus.

The processor may be further configured to: partition the first word into a plurality of phonemes; identify an alternate phoneme of a first phoneme included in the plurality of phonemes based on pronunciation of each of the first phoneme and the alternate phoneme; replace the first phoneme to the alternate phoneme; and obtain the second word.

The processor may be further configured to: identify a number of words commonly included in the first text corpus and the second text corpus; and store the second word in the memory based on the number of words commonly included in the first text corpus and the second text corpus.

The processor may be further configured to, based on the number of words being greater than or equal to a threshold value, store the second word in the memory.

The processor may be further configured to, based on a first ratio of the words commonly included in the first text corpus and a total number of words in the first text corpus and a second ratio of the words commonly included in the second text corpus and a total number of words in the second text corpus being greater than or equal to a threshold value, store the second word in the memory.

The processor may be further configured to: cluster the plurality of words included in the pronunciation dictionary into a first group based on pronunciation of each of the plurality of words; partition each of a set of words included in the first group to which the first word belongs into a plurality of phonemes; and obtain the alternate phoneme based on the pronunciation of the first phoneme from among the plurality of phonemes included in the plurality of words included in the first group.

The processor may be further configured to: identify a number of words commonly included in the first text corpus and the second text corpus; and store the second word to the first group to which the first word belongs, based on the number of words.

The electronic device may further include a microphone. The processor may be further configured to based on a voice being input through the microphone, perform voice recognition of the voice based on the pronunciation dictionary including the second word.

The processor may be further configured to, based on a voice, obtained by an external device having a microphone, being received from the external device, perform voice recognition on the voice based on the pronunciation dictionary including the second word.

According to an aspect of the disclosure, there is provided a controlling method of an electronic device including: obtaining a second word based on a first word from among a plurality of words included in a pronunciation dictionary pre-stored in a memory; obtaining a first text corpus related to the first word through web crawling of the first word; obtaining a second text corpus related to the second word through web crawling of the second word; and verifying the second word based on a result of comparison of the first text corpus and the second text corpus.

The obtaining the second word based on the first word may include: partitioning the first word into a plurality of phonemes; identify an alternate phoneme of a first phoneme included in the plurality of phonemes based on pronunciation of each of the first phoneme and the alternate phoneme; replacing the first phoneme with the alternate phoneme; and obtaining the second word.

The controlling method may further include: storing the second word in the memory. The verifying may include identifying a number of words commonly included in the first text corpus and the second text corpus, and wherein the storing includes storing the second word in the memory based on the number of words.

The storing may include, based on the number of words being greater than or equal to a threshold value, storing the second word in the memory.

The storing may include, based on a first ratio of the words commonly included in the first text corpus and a total number of words in the first text corpus and a second ratio of the words commonly included in the second text corpus and a total number of words in the second text corpus being greater than or equal to a threshold value, storing the second word in the memory.

The controlling method may further include: clustering the plurality of words included in the pronunciation dictionary into a first group based on pronunciation of each of the plurality of words; and partitioning each of a set of words included in the first group to which the first word belongs into a plurality of phonemes.

The controlling method may further include: storing the second word in the first group to which the first word belongs. The verifying may include identifying a number of words commonly included in the first text corpus and the second text corpus. The storing may include storing the second word to the first group to which the first word belongs, based on the number of words.

The controlling method may further include receiving a voice through a microphone; and performing voice recognition of the voice based on the pronunciation dictionary including the second word.

The controlling method may further include: receiving a voice which is input through a microphone of an external device from the external device; and performing voice recognition on the voice based on the pronunciation dictionary including the second word.

According to an aspect of the disclosure, there is provided a non-transitory computer readable medium storing computer instructions executed by a processor of an electronic device to make the electronic device perform operations including: obtaining a second word based on a first word from among a plurality of words included in a pronunciation dictionary pre-stored in a memory; obtaining a first text corpus related to the first word through web crawling of the first word; obtaining a second text corpus related to the second word through web crawling of the second word; and verifying the second word based on a result of comparison of the first text corpus and the second text corpus.

The obtaining the second word based on the first word may include: partitioning the first word into a plurality of phonemes; identify an alternate phoneme of a first phoneme included in the plurality of phonemes based on pronunciation of each of the first phoneme and the alternate phoneme; replacing the first phoneme with the alternate phoneme; and obtaining the second word.

According to the various embodiments of the disclosure, the embodiment of the disclosure may improve a voice recognition function by automatically constructing a pronunciation dictionary without modification of a voice recognizer (an acoustic model and a language model, etc.) and an aid of a specialist, in response to variation of texts as a result of voice recognition.

BRIEF DESCRIPTION OF THE DRAWINGS

The above and other aspects, features and advantages of certain embodiments of the disclosure will be more apparent from the following description taken in conjunction with the accompanying drawings, in which:

FIG. 5 is a view to describe an example of a text corpus according to an embodiment;

FIG. 9 is a flowchart provided to explain a controlling method in further detail according to an embodiment.

DETAILED DESCRIPTION

Figure 1:
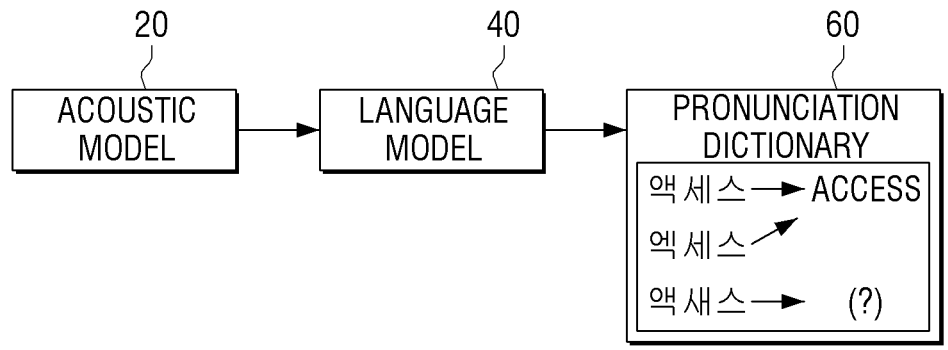
FIG. 1 is a block diagram illustrating a voice recognition module according to an embodiment.

Before specifically describing the disclosure, a method for demonstrating the present specification and drawings will be described.

First of all, the terms used in the present specification and the claims are general terms identified in consideration of the functions of the various embodiments of the disclosure. However, these terms may vary depending on intention, legal or technical interpretation, emergence of new technologies, and the like of those skilled in the related art. Also, there may be some terms arbitrarily identified by an applicant. Unless there is a specific definition of a term, the term may be construed based on the overall contents and technological common sense of those skilled in the related art.

Further, like reference numerals indicate like components that perform substantially the same functions throughout the specification. For convenience of descriptions and understanding, the same reference numerals or symbols are used and described in different embodiments. In other words, although elements having the same reference numerals are all illustrated in a plurality of drawings, the plurality of drawings do not mean an embodiment.

The terms such as "first," "second," and so on may be used to describe a variety of elements, but the elements should not be limited by these terms. The terms are used only for the purpose of distinguishing one element from another. For example, the elements associated with the ordinal numbers should not be limited in order or order of use by the numbers. If necessary, the ordinal numbers may be replaced with each other.

A singular expression includes a plural expression, unless otherwise specified. It is to be understood that the terms such as "comprise" or "consist of" are used herein to designate a presence of a characteristic, number, step, operation, element, component, or a combination thereof, and not to preclude a presence or a possibility of adding one or more of other characteristics, numbers, steps, operations, elements, components or a combination thereof.

The term such as "module," "unit," "part", and so on is used to refer to an element that performs at least one function or operation, and such element may be implemented as hardware or software, or a combination of hardware and software. Further, except for when each of a plurality of "modules", "units", "parts", and the like needs to be realized in an individual hardware, the components may be integrated in at least one module or chip and be realized in at least one processor.

Also, when any part is connected to another part, this includes a direct connection and an indirect connection through another medium. Further, when a certain portion includes a certain element, unless specified to the contrary, this means that another element may be additionally included, rather than precluding another element.

The embodiment of the disclosure will be further described with reference to the attached drawings.

FIG. 1 is a block diagram illustrating a voice recognition module 10 according to an embodiment.

Referring to FIG. 1, a voice recognition module 10 may include an acoustic model 20, a language model 40, and a pronunciation dictionary 60.

The acoustic model 20 may include information on features of a voice signal which corresponds to a phoneme or a word.

The language model 40 may include information which corresponds to an arrangement order or a relation of one or more phonemes or words.

In the pronunciation dictionary 60, a plurality of words or sentences may be partitioned and stored by meanings, or output words that match a recognized specific word may be pre-stored.

For example, when a user utters "엑세스", intending to say the word, "ACCESS," the electronic device 100 (FIG. 2) for voice recognition including the voice recognition module 10 of FIG. 1 may only extract a user's voice through a process of removing noise of a user and extract features from the extracted voice.

In this case, extracting features may include extracting a linear predictive coefficient, Cepstrum, Mel Frequency Cepstral Coefficient (MFCC), frequency bandwidth energy (filter bank energy), or the like, from a voice signal.

The electronic device 100 may perform modeling of the features of a voice signal to measure and recognize similarity of the extracted features using the acoustic model 20. If the modeling result is normal, the electronic device 100 may recognize phonemes ("ㅇ"), "ㅔ", "ㄱ", "ㅅ", "ㅔ", "ㅅ", "ㅡ" from the word, "엑세스" uttered by the user.

For reference, the pronunciation of each Korean consonant and each vowel are shown below.

| Consonants | | | | | | | | | |
|---|---|---|---|---|---|---|---|---|---|
| ㄱ | ㄴ | ㄷ | ㄹ | ㅁ | ㅂ | ㅅ | ㅇ | ㅈ | ㅊ |
| g, k | n | d, t | r, l | m | b, p | s | ng | j | ch |
| ㅋ | ㅌ | ㅍ | ㅎ | ㄲ | ㄸ | ㅃ | ㅆ | ㅉ | |
| k | t | p | h | kk | tt | pp | ss | jj | |

| Vowels | | | | | | | |
|---|---|---|---|---|---|---|---|
| ㅏ | ㅑ | ㅓ | ㅕ | ㅗ | ㅛ | ㅜ | |
| a | ya | eo | yeo | o | yo | u | |
| ㅠ | ㅡ | ㅣ | ㅐ | ㅒ | ㅔ | ㅖ | |
| yu | eu | i | ae | yae | e | ye | |

| Vowels | | | | | | |
|---|---|---|---|---|---|---|
| ㅘ | ㅝ | ㅙ | ㅟ | ㅞ | ㅚ | ㅢ |
| oe | wa | wae | wi | wo | we | ui |

As a result of modeling of the linguistic order relation of phonemes using the language model 40, the electronic device 100 may obtain "엑세스" in which phonemes are normally combined.

As a result, the electronic device 100 may recognize that "엑세스" obtained by a user's utterance is intended to be the word, "ACCESS" based on a pre-stored specific word stored in the pronunciation dictionary 60 and the matched output word thereof.

It may be considered that the pronunciation recognized through the acoustic model 20 and the language model 40 of the electronic device 100 is "액세스", instead of "엑세스." This may be a case where the user correctly pronounces the "액세스" distinguished from the "엑세스", or a case where the electronic device 100 erroneously recognizes "ㅔ" to "ㅐ" in the modeling of each phoneme using the acoustic model 20.

In this case, referring to FIG. 1, because "액세스" is not stored in the pronunciation dictionary 60, a result may occur that the electronic device 100 may not recognize "액세스" uttered by a user, through the voice recognition module 10 of FIG. 1.

In order to solve the problem, in the disclosure, the pronunciation dictionary 60 may be updated. This will be further described hereinbelow.

Figure 2:
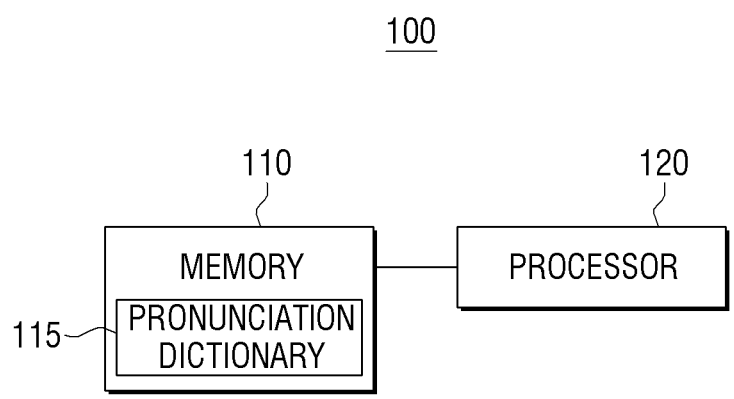
FIG. 2 is a block diagram illustrating a configuration of an electronic device according to an embodiment

FIG. 2 is a block diagram illustrating a configuration of an electronic device 100 according to an embodiment.

Here, the electronic device 100 may be implemented as a server, a set-top box, PC, TV, a terminal device, or the like.

Referring to FIG. 2, the electronic device 100 may include a memory 110 and a processor 120.

The memory 110 may include a pronunciation dictionary 115 in which a plurality of words are pre-stored.

In the pronunciation dictionary 115, a word corresponding to a spoken word recognized through the electronic device 100, a word matched to a spoken pronunciation, or information corresponding to meaning may be pre-stored.

Alternatively, the pronunciation dictionary 115 may pre-store information corresponding to words or meanings matched with spoken words or pronunciations received from an external device through the electronic device 100.

To this end, the memory 110 may be implemented as a nonvolatile memory (ex, a hard disk, a solid state drive (SSD), and a flash memory), a volatile memory, etc. to be used for storing data in the form of the pronunciation dictionary 115.

The processor 120 controls the overall operations of the electronic device 100.

The processor 120 may include a random access memory (RAM) (not shown), a Read-Only Memory (ROM) (not shown), a central processing unit (CPU) (not shown), a graphic processing unit (GPU), and a system bus (not shown), and may perform operations or data processing related to control of other components included in the electronic device 100.

The processor 120 may obtain a variant word or an alternate word (hereinafter "variant word") with respect to a specific word from among the plurality of words pre-stored in the pronunciation dictionary 115.

Specifically, the processor 120 may partition a specific word into a plurality of phonemes, obtain a similar phoneme similar in pronunciation to a particular phoneme based on characteristics of the specific phoneme among the plurality of partitioned phonemes, and obtain a variant word for the specific word by replacing the particular phoneme with the similar phoneme and adding the variant word into the memory.

Here, the characteristic of the specific phoneme may be a feature vector extracted from a voice signal for a user utterance corresponding to the specific phoneme. In machine learning and pattern recognition, feature vectors may be used to represent numeric or symbolic characteristics, called features, of an object. The feature vectors are important for many different areas of machine learning and pattern processing. The feature vectors are the equivalent of vectors of explanatory variables that are used in statistical procedures such as linear regression. Here, the method of extracting the feature vector may be the same as the method described in FIG. 1.

The characteristic of a specific phoneme may be based on a statistical model which statistically summarizes a probability that each phoneme is matched with the feature vector value.

In this case, the processor 120 may obtain a phoneme which has the feature vector similar to a particular phoneme or a phoneme of which feature vector value is closest to the feature vector value which has a high probability of matching the particular phoneme, as a similar phoneme which has a similar pronunciation with the particular phoneme.

Accordingly, the processor 120 may obtain at least one variant word by replacing a particular phoneme with the similar phoneme(s) in the specific word.

Figure 3:
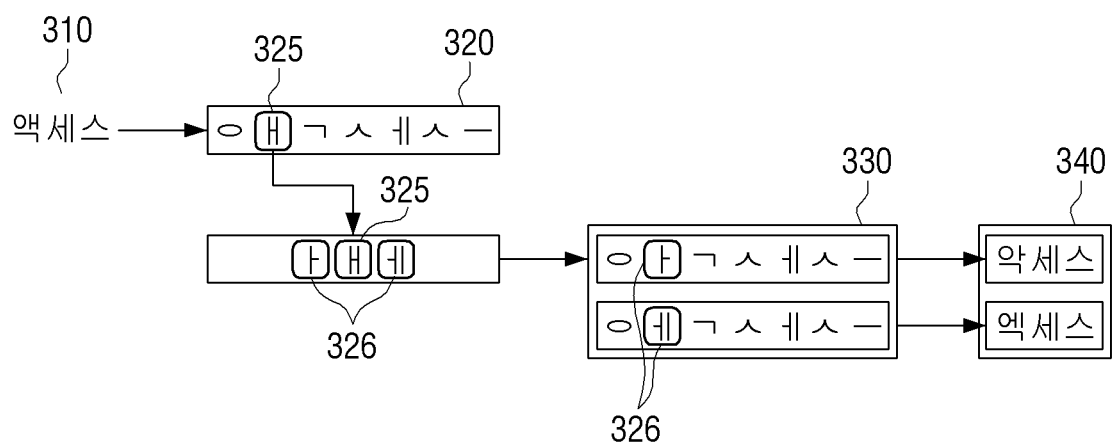
FIG. 3 is a view to describe obtaining a variation word according to an embodiment.

FIG. 3 is a view to describe obtaining a variant word according to an embodiment. FIG. 3 illustrates a process of obtaining a variant word for the word, "액세스" 310 by the processor 120, which is one of the plurality of words pre-stored in the pronunciation dictionary 115.

The processor 120 may partition/separate the spoken word, "액세스," into a plurality of phonemes 320, that is, ("ㅇ"), "ㅐ", "ㄱ", "ㅅ", "ㅔ", "ㅅ", and "ㅡ".

In this case, referring to the pronunciation of Korean alphabets described above, the processor 120 may obtain "ㅏ" and "ㅔ" 326 which have a similar pronunciation with "ㅐ" by using the feature vector value of the voice signal corresponding to "ㅐ" 325, which is one of the plurality of partitioned phonemes 320.

In this case, the processor 120 may obtain a new plurality of phoneme sets 330 by replacing the "ㅐ" 325 with each of "ㅏ" and "ㅔ" 326, and obtain the variant words "악세스" and "엑세스," 340 by combining the new plurality of phoneme sets 330, respectively.

However, the method of obtaining a variant word according to the disclosure is not limited to the embodiment of FIG. 3. For example, depending on using a phoneme other than "ㅐ" 325 among the plurality of phonemes 320, or using at least one characteristic vector corresponding to pronunciation "ㅐ" 325, the processor 120 may obtain a phoneme other than "ㅏ" and "ㅔ" 326 as a similar phoneme.

Alternatively, one or more similar phonemes may be predetermined for each phoneme.

In the meantime, the processor 120 may, through web crawling on the specific word and the variant word, obtain a first text corpus including a plurality of texts related to the specific word and a second text corpus including a plurality of texts related to the variant word, and verify the variant word based on the comparison result of the first text corpus and the second text corpus. The processor 120 may then store the verified variant word in the memory 110.

Here, the web crawling includes various operations to search the World Wide Web (www) by a manual method or an automatic method.

The processor 120 may search a word through web crawling regarding a specific word or collect data related to the word.

The text corpus may represent a collection of letters, words and/or sentences.

However, in an embodiment of the disclosure, the text corpus refers to data regarding a content or a plurality of words obtained based on the specific word and the variant word obtained as a result of web crawling of each of the specific word and the variant word.

In the meantime, storing the variant word in the memory 110 may represent storing the variant word in the memory 110 as a word having the same meaning as the specific word.

Figure 4:
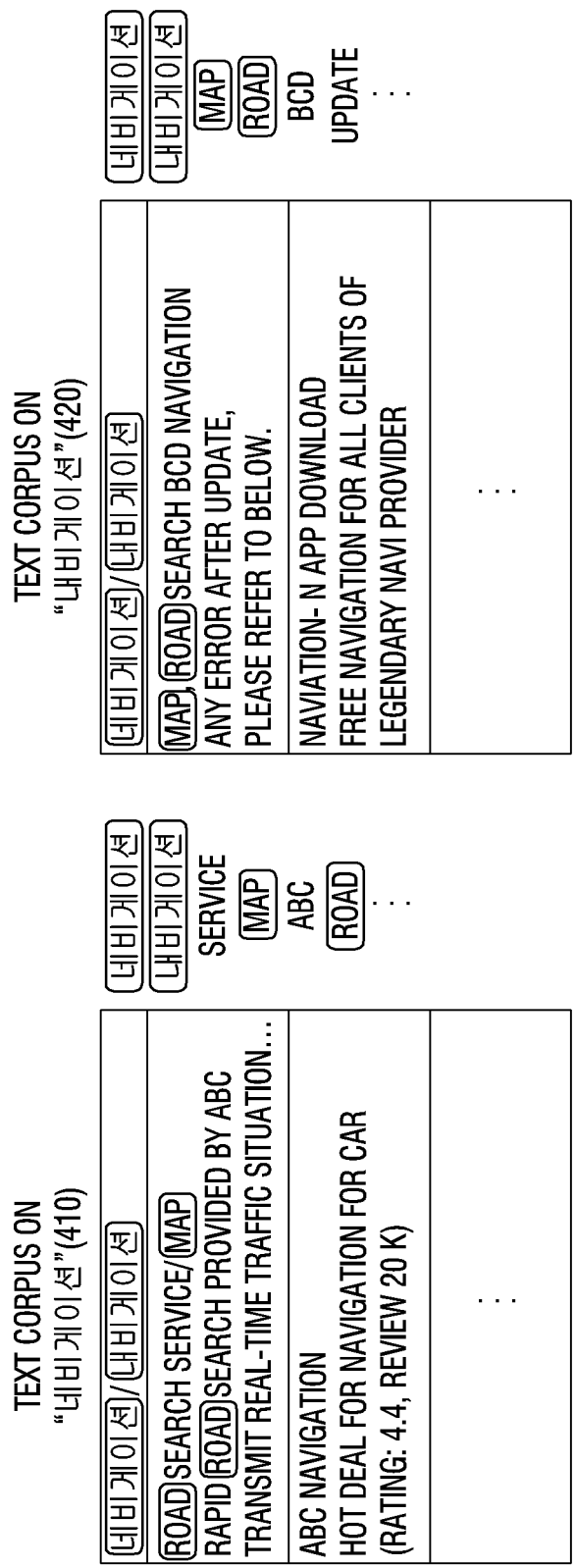
FIG. 4 is a view to describe an example of a text corpus according to an embodiment.

FIGS. 4 and 5 are views to describe examples of a text corpus based on web crawling and a comparison method according to embodiments.

In FIG. 4, it is assumed that a specific word, "네비게이션," (corresponding to "navigation" in English) is pre-stored in the pronunciation dictionary 115. In this case, the processor 120 may obtain a variant word, "내비게이션" which is obtained by changing a particular phoneme, "ㅔ", which is one of a plurality of phonemes included in "네비게이션", to a phoneme having a similar pronunciation "ㅐ.".

Through web crawling for the pre-stored word "네비게이션" and the variant word "내비게이션", the processor 120 may build a text corpus 410 (a first text corpus) on "네비게이션" and a text corpus 420 (a second text corpus) on "내비게이션" as illustrated in FIG. 4.

As shown in FIG. 4, the text corpus for each word may be a list of the contents searched for by the web crawling in a predetermined order, or may be a list of words separately included in the contents. However, the embodiment of the disclosure is not limited thereto.

The predetermined order of display may be based on the creation time of the content searched as a result of the web crawling, the relevance of the searched content to the word subject to web crawling, the visit history of another user to the web page including the content, or the like.

Referring to FIG. 4, the text corpus 410 for "네비게이션" may include words such as "네비게이션", "내비게이션", "service", "map", "ABC", "road" or the like. The text corpus 420 for "내비게이션" may also include words such as "네비게이션", "내비게이션", "map", "road", "BCD", "update", or the like.

In this case, the processor 120 may compare the two text corpuses 410 and 420 obtained as a result of the web crawling of "네비게이션" and "내비게이션" and identify that the two text corpuses 410 and 420 commonly include words such as "네비게이션", "내비게이션", "map", "road", or the like.

At this time, the processor 120 may identify the number of words commonly included in the first text corpus for the specific word and the second text corpus for the variant word, and determine whether to store the variant word in the pronunciation dictionary 115 based on the number of commonly included words.

To be specific, when the number of the commonly included words is greater than or equal to a predetermined threshold value, the processor 120 may store the variant word in the memory 110.

As an example, if the predetermined threshold value is three, in case of FIG. 4, the number of words commonly included in the two text corpuses 410 and 420 is at least four ("네비게이션", "내비게이션", "map" and "road"), the processor 120 may store the variant word "내비게이션" in the pronunciation dictionary 115.

Alternatively, when a ratio of the commonly included words in the first text corpus and the total number of the words in the first text corpus and a ratio of the commonly included words in the second text corpus and the total number of the words in the second text corpus are equal to or greater than a predetermined threshold value, the variant word may be stored in the memory 110.

For example, if the predetermined threshold value is five percent, and the inclusion ratio of the words "네비게이션", "내비게이션", "map", "road", etc., which are commonly included in two text corpuses 410 and 420, in each of the two text corpuses 410 and 420 is six percent in the text corpus 410 for "네비게이션" and seven percent in the text corpus 420 for "내비게이션", the processor 120 may store the variant word "내비게이션" in the pronunciation dictionary 115.

The processor 120 may store in the pronunciation dictionary 115 that "내비게이션" is a word having the same meaning as "네비게이션."

In FIG. 5, it is assumed that a word pre-stored in the pronunciation dictionary 115 is "엑세스" (corresponding to "access" in English) and a variant word obtained from "엑세스" is "억서스".

Referring to FIG. 5, a text corpus 510 for "엑세스" may include words such as "Data", "Access", "Search", "Results", "Data", "엑세스", or the like. Meanwhile, a text corpus 520 for "억서스" may include words such as "서스펜스", "Suspense" "novel", "first book", "억", or the like.

In the case of FIG. 5, the processor 120 does not store the variant word "억서스" in the pronunciation dictionary 115 in that the two text corpuses 510 and 520 have almost no descriptive/related words in common.

In the meantime, when obtaining the variant word for the specific word, the processor 120 may limit the range of the similar phoneme to a phoneme included in a word having a pronunciation similar to the specific word.

To this end, the processor 120 may cluster a plurality of words included in the pronunciation dictionary 115 into the same group for words having similar pronunciation.

Here, the words having similar pronunciation may mean that, for example, if there are different phonemes among the plurality of phonemes included in each word, the different phonemes are similar phonemes having similar pronunciations.

Here, the determination criterion for the similar phoneme may be based on the feature vector corresponding to each phoneme described above with reference to FIG. 1. Alternatively, the similar phoneme(s) may be predetermined for each phoneme based on the pronunciation.

For example, if there is only a difference between "ㅔ" and "ㅐ" among the phonemes included in each of "엑세스" and "액새스" (corresponding to "access" in English), then "ㅔ" and "ㅐ" are determined as similar phonemes having similar pronunciations, and consequently, "엑세스" and "액새스" may be clustered into the same group by the processor 120 as words having similar pronunciations.

Meanwhile, the processor 120 may cluster the words having the same meaning into the same group. Thus, the processor 120 may cluster the words that have the same meaning and similar pronunciations into the same group.

The processor 120 may partition each of a plurality of words included in a group of words to which the specific word belongs into a plurality of phonemes, and obtain similar phonemes similar to the specific phoneme from among a plurality of phonemes.

For example, when the "엑세스" and the "액새스" (corresponding to "access" in English) are clustered into the same group, the processor 120 may obtain a plurality of phonemes "ㅔ", "ㄱ", "ㅅ", "ㅖ", "ㅡ" from "엑세스" and "액새스" included in the same group.

Here, the processor 120 may obtain "ㅐ" which has the similar pronunciation with "ㅔ" included in "엑세스", from among the plurality of phonemes.

The processor 120 may change the specific phoneme to the obtained similar phoneme and obtain the variant word for the specific word.

For example, the processor 120 may obtain "엑새스" which is the variant word that changes "ㅔ" to "ㅐ" from "엑세스".

Figure 6:
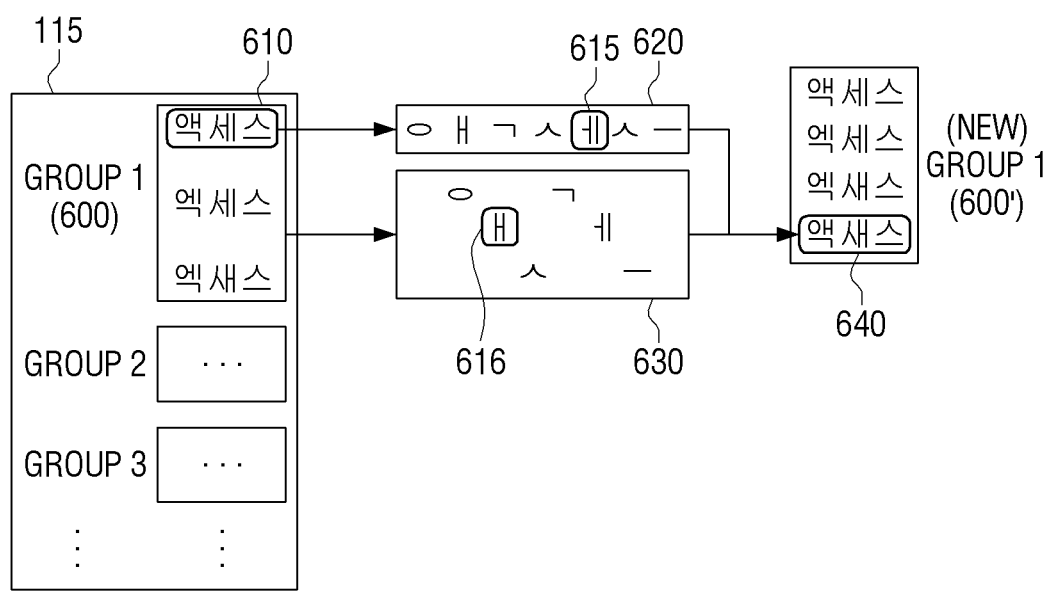
FIG. 6 is a view to describe an example of obtaining a variation word according to an embodiment.

FIG. 6 illustrates an example of obtaining a variant word according to clustering of the disclosure and describes obtaining and storing a variant word according to clustering.

Referring to FIG. 6, the processor 120 may cluster the words "액세스", "엑세스", "액새스" having the same meaning and similar pronunciation, among the plurality of words stored in the pronunciation dictionary 115, into a first group 600.

In this case, the processor 120 may partition the "액세스" 610 among the three words in the first group 600 into a plurality of phonemes 620. In addition, the processor 120 may partition each of the "액세스", "엑세스", "액새스" into a plurality of phonemes 630.

The processor 120 then may change "ㅐ" 615 of the plurality of phonemes 620 partitioned from the "액세스" 610 to "ㅐ" 616 which has a similar pronunciation as "ㅔ" 615, from among the plurality of phonemes 630 and obtain the variant word " 액새스 " 640, which is different from the "액시스", "엑세스", "엑새스" of the first group 600.

In the meantime, the processor 120 may, through the web crawling of the specific word and the variant word, obtain a first text corpus including a plurality of texts related to the specific word and a second text corpus including a plurality of texts associated with the variant word, and verify the variant word based on the comparison of the first text corpus and the second text corpus. The processor 120 may store the verified variant word in the memory 110.

The processor 120 may store the variant word in a group to which the specific word belongs, based on the result of comparison between the first text corpus and the second text corpus.

Specifically, the processor 120 may identify the number of words commonly included in the first text corpus and the second text corpus, and based on the number of commonly included words, may store the variant word in the same group to which the specific word belongs.

Referring to FIG. 6, the processor 120 may store a new first group 600' as a result of adding " 액새스 " 640 to the first group 600 in the pronunciation dictionary 115, based on the result of comparing the first text corpus by web crawling of " 액시스 " 610 and the second text corpus by web crawling of " 액새스 " 640.

In the meantime, according to an embodiment of the disclosure, the electronic device 100 and an external device may be configured to perform variant word acquisition and variant word verification separately.

The external device may be implemented as a server, TV, PC, a set-top box, and the like, and the electronic device 100 and a server that is an external device may be included in the same network and exchange data.

For example, when the electronic device 100 transmits the specific word and the variant word obtained from the specific word to an external device, the external device may transmit the result of comparing each text corpus by the web crawling for the specific word and the variant word back to the electronic device 100, and update the pronunciation dictionary 115 which is provided in the electronic device 100, based on the comparison result.

The electronic device 100, after receiving the specific word from another external device which is implemented as a server or the like, may obtain the variant word from the received specific word and transmit the variant word to the external device.

Alternatively, when the external device transmits the specific word and the variant word obtained from the specific word to the electronic device 100, the processor 120 may compare each text corpus which is established through web crawling of each of the specific word and the variant word, and send the result of the comparison back to the external device via the communication interface 150 (FIG. 7), and update the pronunciation dictionary of the external device based on the result.

The electronic device 100 may transmit the result of the comparison to another external device ED2, and update the pronunciation dictionary of the another external device ED2 based on the result.

Meanwhile, as another embodiment, when at least one of the words in the pronunciation dictionary included in the external device is selected as the specific word by the external device and is transmitted to the electronic device 100, the electronic device 100 may acquire and verify the variant word based on the specific word received from the external device and transmit the verified variant word back to the external device or store the verified variant word in the pronunciation dictionary stored in the memory 110 of the electronic device 100.

Figure 7:
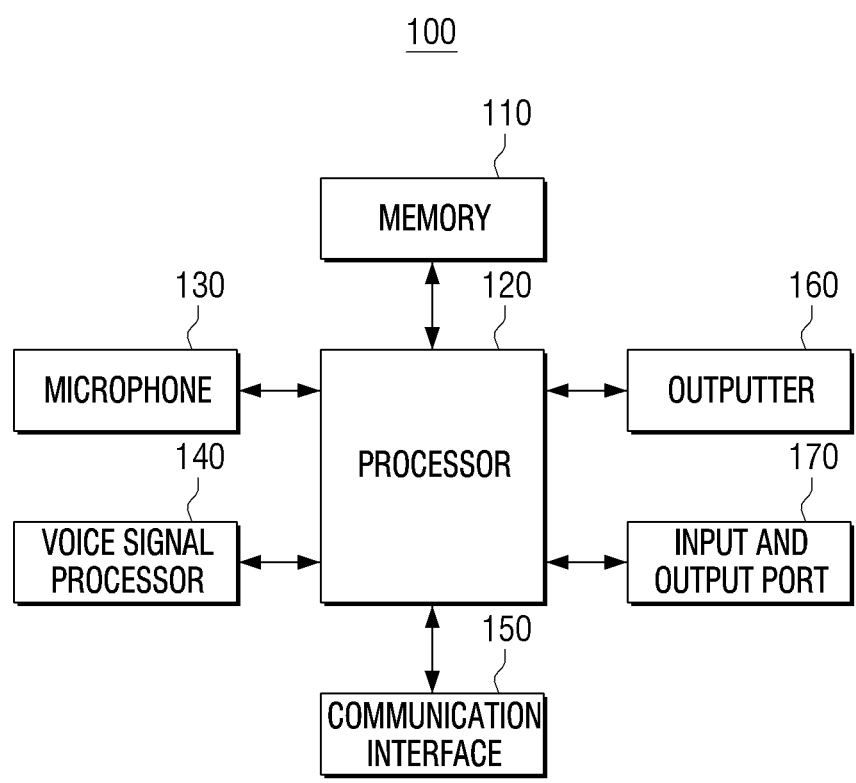
FIG. 7 is a block diagram to describe a detailed configuration of an electronic device according to an embodiment.

FIG. 7 is a block diagram to describe a detailed configuration of an electronic device 100 according to an embodiment.

Referring to FIG. 7, the electronic device 100 may include at least one of a microphone 130, a voice signal processor 140, a communication interface 150, an outputter 160, and an input and output port 170, in addition to the memory 110 and the processor 120.

The microphone 130 may receive a user's utterance.

As an embodiment of the disclosure, the processor 120 may, when a user's voice is input through the microphone 130, perform voice recognition of the user's voice based on the pronunciation dictionary 115 in which the variant word is stored.

When the electronic device 100 is implemented as a display device or a terminal device, when the user's voice is input through the microphone 130, the processor 120 may digitalize the voice signal corresponding to a user's voice through the voice signal processor 140 and then transmit the voice signal to a server or an external device ED1 which is a set-top box through the communication interface 150. At this time, the external device ED1 may perform voice recognition on the user's voice using the received digital voice signal and a pronunciation dictionary (not shown) of the external device. In this case, the external device may transmit the voice recognition result to the electronic device 100.

When the electronic device 100 is embodied as a remote control device, the electronic device 100 may transmit the user's voice signal which is input through the microphone 130 to an external device ED1 under the control of the electronic device 100. The external device ED1 may perform voice recognition using the received user's voice signal.

To this end, an external device ED1 under the control of the electronic device 100 may be implemented as a TV, a PC, a set-top box, or the like. The electronic device 100 may be a remote control designed for the control of an external device ED1, a wireless keyboard/mouse, or the like, or a smartphone in which software such as a remote control application for controlling an external device (not shown) may be stored and executed.

When the electronic device 100 is embodied as a smartphone in which a remote control application is stored, the communication interface 150 included in the electronic device 100 may include a Bluetooth communication (not shown) in communication with an external device ED1, and a Wi-Fi and Ethernet communication module capable of communicating with a server (not shown) separately from the module, or may perform both communication with an external device ED1 and a server through the same Wi-Fi communication module.

When the electronic device 100 is implemented as a remote control device, the user voice signal input to the electronic device 100 may be transmitted to a server (not shown) via an external device ED1 under the control of the electronic device 100. The server (not shown) may perform voice recognition using the received user's voice signal.

It may be assumed a case where a microphone is not provided in the electronic device 100. For example, when the user's voice input to an external device ED1 having a microphone is received from an external device to the electronic device 100, the processor 120 may perform voice recognition of the user's voice received based on the pronunciation dictionary 115 where the variant word is stored.

At this time, the electronic device 100 may be a display device and an external device (not shown) may be implemented as a remote control device for controlling the electronic device 100, or the external device may be a display device, and the electronic device 100 may be implemented as a set-top box or a server. Alternatively, a user's voice signal input to an external device that is a remote control device may be transmitted to the electronic device 100 that is a server, via a display device (not shown) and/or a set-top box (not shown) under the control of the external device.

The external device may convert the user's voice inputted into the external device into a digital signal, and transmit the digital signal to the electronic device 100 through Bluetooth communication or Wi-Fi communication. Alternatively, the external device may transmit the user's voice input to the external device to the electronic device 100 in the form of a broadcast signal through a tuner provided in the electronic device 100.

For the user's voice input to the external device that is converted to a digital signal, the external device may transmit the voice recognition result to the electronic device 100 based on the pronunciation dictionary provided in the external device.

The voice signal processor 140 may include an analog-digital converter (ADC, now shown) or a noise remover (not shown), or the like.

The ADC (not shown) may convert the multi-channel analog signal which is input from the microphone 110 to a digital signal.

The noise remover removes a noise element from among the converted digital signal where the noise element and the user's voice element are included. The noise remover outputs a digital signal from which the noise element is removed to the processor 120.

The processor 120 may extract the feature vectors such as linear predictive coefficient, Cepstrum, Mel Frequency Cepstral Coefficient (MFCC), frequency bandwidths energy (filter bank energy), or the like, with respect to the digital voice signal from which the noise element is removed.

The processor 120 may perform voice signal through at least one of dynamic time warping (DTW), hidden markov modelling (HMM), and neural networks, based on the extracted feature vectors, an acoustic model and a language model.

The communication interface 150 is configured to perform communication with various types of external devices according to various types of communication methods. The communication interface 150 may include a Wi-Fi chip (not shown) and a Bluetooth chip (not shown).

The processor 120 may communicate with various external devices using the communication interface 150. The communication interface 150 is a means to perform data communication by wire or wirelessly with at least one external device.

When performing data communication with an external device using a wireless communication method, the communication interface 150 may include at least one of a WIFI DIRECT communication module, a Bluetooth module, an infrared data association (IrDA) module, a near field communication (NFC) module, the Zigbee module, the cellular communication module, the third generation (3G) mobile communication module, the fourth generation (4G) mobile communication module, the 4G long term evolution (LTE) communication module.

When performing data communication with an external device using a wired communication method, the communication interface 150 may include an interface module such as a USB, and may be physically connected to an external terminal device such as PC through the interface module to transmit/receive voice or image data, or transmit/receive firmware data to perform firmware upgrade.

The outputter 160 may include a display (not shown), a voice outputter (not shown), or the like.

A display may be implemented as a liquid crystal display (LCD), a plasma display panel (PDP), an organic light-emitting diodes (OLED), transparent OLED (TOLED), or the like for displaying a voice recognition result or an event according to a voice recognition result under the control of the processor 120. In the case of the LCD, a driving circuit, a backlight unit, and the like, which can be implemented in the form of an a-si TFT, a low temperature poly silicon (LTPS) TFT, an organic TFT (OTFT), or the like may be also included.

The display may be implemented in a form of a touch screen capable of sensing a user's touch operation.

The voice outputter is configured to output audio corresponding to an event according to a voice recognition result or a voice recognition result under the control of the processor 120. For example, the voice outputter may output audio included in a broadcast signal received through a tuner, audio which is input through the communication interface 150 or the microphone 130, or audio included in an audio file stored in the memory 110.

The voice outputter may include a speaker and a headphone/earphone output terminal.

Through the input and output port 170, the electronic device 100 may transmit/receive data with respect to a specific voice or image with the external device.

For this, the input and output port 170 may be implemented as a wired port such as a high-definition multimedia interface (HDMI) port, a display port, a red-green-blue (RGB) port, a Digital Visual Interface (DVI) port, a Thunderbolt, and a component port. Alternatively, the input and output port 170 may be implemented as a port for wireless communication such as Wi-Fi or Bluetooth.

For one example, the electronic device 100 may receive data on an image and/or voice from an external device through the input and output port 170 and output the corresponding image and/or voice through the outputter 160.

Alternatively, the input and output port 170 may transmit data on a specific voice or image to an external device so that the specific voice and/or image may be output through a voice outputter (not shown) and/or a display (not shown) of the external device.

Specifically, when the electronic device 100 is a set-top box or a server that does not have a separate outputter 160, the electronic device 100 may transmit the data regarding image and/or the voice to the external device via the input and output port 170 to output the corresponding image and/or voice through an external device such as a TV, a PC, a speaker device, or a terminal device including the display and/or the audio outputter.

Figure 8:
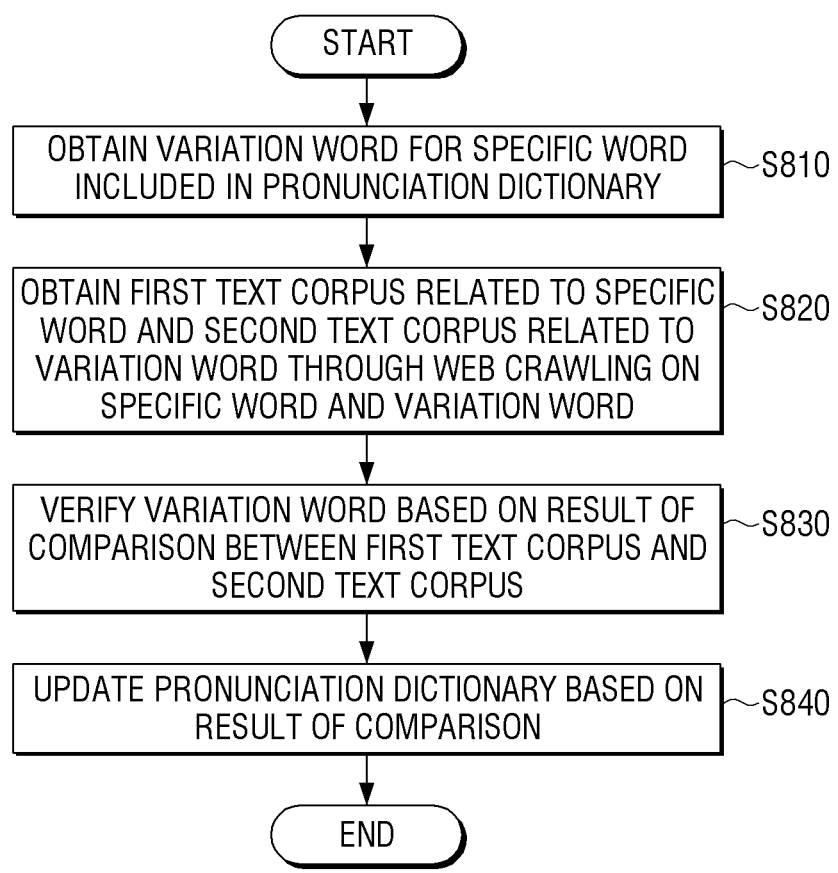
FIG. 8 is a flowchart provided to explain a controlling method according to an embodiment.

FIG. 8 is a flowchart provided to explain a controlling method according to an embodiment.

Referring to FIG. 8, a variant word based on a specific word is obtained from among a plurality of words included in a pronunciation dictionary pre-stored in the memory 110 in step S810.

Then, through a web crawling for each specific word and variant word, the first text corpus including a plurality of texts related to the specific word and the second text corpus including a plurality of texts associated with the variant word are obtained in step S820.

Then, based on the result of comparing the first text corpus and the second text corpus, the variant word may be verified in step S830.

Finally, based on the result of comparison, the pronunciation dictionary pre-stored in the memory 110 may be updated in step S840.

FIG. 9 is a flowchart provided to explain a controlling method in further detail according to an embodiment.

Referring to FIG. 9, the specific word among a plurality of words included in a pronunciation dictionary pre-stored in the memory 110 is divided into a plurality of phonemes in step S910. For example, if the specific word is "아마존" (corresponding to "Amazon" in English), the plurality of phonemes may be "ㅇ", "ㅏ", "ㅁ", "ㅏ", "ㅈ", "ㅗ", and "ㄴ".

Thereafter, a similar phoneme similar in pronunciation to the specific phoneme may be obtained based on the characteristics of the specific phoneme among the plurality of phonemes in step S920. At this time, a phoneme of which pronunciation is similar to the specific phoneme may be pre-stored, or a phoneme corresponding to a voice signal having a feature vector that is similar to the feature vector value of a voice signal corresponding to the specific phoneme may be obtained as the similar phoneme.

For example, from among the plurality of phonemes, "ㅓ" which is a phoneme of which pronunciation is similar to "ㅏ" may be obtained as the similar phoneme.

Next, the variant word for the specific word is obtained by changing the specific phoneme to the obtained similar phoneme in step S930. In the case of the "아마존" above, "아머존" which changes the "ㅏ" to "ㅓ" may be obtained.

However, the obtained variant word is not immediately stored in the pronunciation dictionary 115 in the memory, but a verification process for the variant word needs to be performed as follows. Specifically, it is necessary to confirm whether a word such as "아머존" is a word which is actually used as "아마존".

First, through a web crawling of the specific word and the variant word, the first text corpus including a plurality of texts related to the specific word and the second text corpus including a plurality of texts related to the variant word are obtained in step S940.

For example, based on the result of the web crawling regarding "아마존" and "아머존" respectively, respective text corpuses may be established.

Thereafter, the variant word is verified based on the result of the comparison between the first text corpus and the second text corpus in step S950, and the verified variant word is stored in the memory 110. At this time, the variant word may be stored in the pronunciation dictionary 115 included in the memory 110 as a word having the same meaning as the specific word in step S950.

In this case, the number of words commonly included in the first text corpus and the second text corpus may be identified, and the variant word may be stored in the memory based on the number of the commonly included words.

To be specific, when the number of the commonly included words is greater than or equal to the preset threshold value, the variant word may be stored in the memory.

Alternatively, when the ratio of the commonly included words in the first text corpus and the ratio of the commonly contained words in the second text corpus are equal to or greater than a preset threshold value, the variant word may be stored in the memory.

For example, if the number of commonly included words to each of the text corpus for "아마존" and "아머존" is greater than or equal to a predetermined threshold value, the processor 120 may store "아머존" in the pronunciation dictionary 115 as the word having the same meaning as "아마존".

Meanwhile, the controlling method may include clustering of a plurality of words included in the pronunciation dictionary into the same group for each word having a similar pronunciation, classifying a plurality of words included in the group to which the specific word belongs into a plurality of phonemes, and obtaining the similar phoneme in which pronunciation is similar to the specific phoneme among the plurality of phonemes.

In this case, the variant word may be verified based on the result of the comparison between the first text corpus and the second text corpus, and the verified variant word may be stored in the group to which the specific word belongs to.

Specifically, the number of words commonly included in the first text corpus and the second text corpus may be identified, and based on the number of the commonly included words, the variant word may be stored in the group to which the specific word belongs to.

The controlling method may include, based on a user's voice being input through a microphone, performing voice recognition on the user's voice based on the pronunciation dictionary in which the variant word is stored.

For example, if "아머존" which was not stored in the pronunciation dictionary 115 is stored in the pronunciation dictionary 115 as a word which has the same meaning (Amazon) as the word "아마존" through the steps S810 to S840, even if a user utters "아머존", the word may be recognized as a word having the meaning of "Amazon."

Alternatively, when the user's voice is input through the microphone of the external device, the input voice may be received from the external device, and voice recognition may be performed on the user's voice based on the pronunciation dictionary in which the variant word is stored.

Specifically, when the electronic device 100 is a server and a micro user voice of an external device (not shown) recognizing the user's voice is input, the electronic device 100 may receive the user's voice from the external device and recognize the user's voice based on a pronunciation dictionary provided in the memory 110.

The controlling method of the electronic device of FIG. 8 may be executed by the processor 120 of the electronic device 100 but is not limited thereto. For example, the controlling method of FIG. 8 may be performed by the processor 120 of the electronic device 100. In addition, the controlling method of FIG. 8 may be performed by the system (not shown) including two or more electronic devices that are connected to each other.

The various embodiments described above may be implemented in a recordable medium which is readable by computer or a device similar to computer using software, hardware, or the combination of software and hardware.

By hardware implementation, the embodiments of the disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electric units for performing other functions.

In some cases, embodiments described herein may be implemented by the processor 120 itself. According to a software implementation, embodiments such as the procedures and functions described herein may be implemented with separate software modules. Each of the above-described software modules may perform one or more of the functions and operations described herein.

Meanwhile, the computer instructions for performing the processing operations in the electronic device 100 according to the various embodiments of the disclosure described above may be stored in a non-transitory computer-readable medium. The computer instructions stored in this non-transitory computer-readable medium cause the above-described specific device to perform the processing operations in the electronic device 100 according to the above-described various embodiments when executed by the processor of the specific device.

The non-transitory computer readable medium refers to a medium that stores data semi-permanently rather than storing data for a very short time, such as a register, a cache, a memory or etc., and is readable by an apparatus. In detail, the aforementioned various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

While embodiments have been shown and described, it will be understood by those skilled in the art that various changes in form and detail may be made therein without departing from the spirit and principles of the present disclosure, the scope of which is defined by the appended claims and their equivalents.

What is claimed is:

1. An electronic device comprising:
a memory configured to store a pronunciation dictionary including a plurality of words; and
a processor configured to:
obtain a second word based on a first word of the plurality of words,
obtain a first text corpus related to the first word through web crawling of the first word and a second text corpus related to the second word through web crawling of the second word,
verify the second word based on a result of comparison of the first text corpus and the second text corpus, and
provide the second word to the pronunciation dictionary of the memory based on the verification result.

2. The electronic device of claim 1, wherein the processor is further configured to:
partition the first word into a plurality of phonemes,
identify an alternate phoneme of a first phoneme included in the plurality of phonemes based on pronunciation of each of the first phoneme and the alternate phoneme;
replace the first phoneme to the alternate phoneme; and
obtain the second word.

3. The electronic device of claim 1, wherein the processor is further configured to:
identify a number of words commonly included in the first text corpus and the second text corpus; and
store the second word in the memory based on the number of words commonly included in the first text corpus and the second text corpus.

4. The electronic device of claim 3, wherein the processor is further configured to, based on the number of words being greater than or equal to a threshold value, store the second word in the memory.

5. The electronic device of claim 3, wherein the processor is further configured to, based on a first ratio of the words commonly included in the first text corpus and a total number of words in the first text corpus and a second ratio of the words commonly included in the second text corpus and a total number of words in the second text corpus being greater than or equal to a threshold value, store the second word in the memory.

6. The electronic device of claim 2, wherein the processor is further configured to:
cluster the plurality of words included in the pronunciation dictionary into a first group based on pronunciation of each of the plurality of words,
partition each of a set of words included in the first group to which the first word belongs into a plurality of phonemes, and
obtain the alternate phoneme based on the pronunciation of the first phoneme from among the plurality of phonemes included in the plurality of words included in the first group.

7. The electronic device of claim 6, wherein the processor is further configured to:
identify a number of words commonly included in the first text corpus and the second text corpus; and
store the second word to the first group to which the first word belongs, based on the number of words.

8. The electronic device of claim 1, further comprising:
a microphone;
wherein the processor is further configured to:
based on a voice being input through the microphone, perform voice recognition of the voice based on the pronunciation dictionary including the second word.

9. The electronic device of claim 1, wherein the processor is further configured to, based on a voice, obtained by an external device having a microphone, being received from the external device, perform voice recognition on the voice based on the pronunciation dictionary including the second word.

10. A controlling method of an electronic device, the method comprising:
obtaining a second word based on a first word from among a plurality of words included in a pronunciation dictionary pre-stored in a memory;
obtaining a first text corpus related to the first word through web crawling of the first word;
obtaining a second text corpus related to the second word through web crawling of the second word;
verifying the second word based on a result of comparison of the first text corpus and the second text corpus; and
providing the second word to the pronunciation dictionary of the memory based on the verifying.

11. The controlling method of claim 10, wherein the obtaining the second word based on the first word comprises:
partitioning the first word into a plurality of phonemes;
identify an alternate phoneme of a first phoneme included in the plurality of phonemes based on pronunciation of each of the first phoneme and the alternate phoneme;
replacing the first phoneme with the alternate phoneme; and
obtaining the second word.

12. The controlling method of claim 10, further comprising:
- storing the second word in the memory,
- wherein the verifying comprises identifying a number of words commonly included in the first text corpus and the second text corpus, and
- wherein the storing comprises storing the second word in the memory based on the number of words.

13. The controlling method of claim 12, wherein the storing comprises, based on the number of words being greater than or equal to a threshold value, storing the second word in the memory.

14. The controlling method of claim 12, wherein the storing comprises, based on a first ratio of the words commonly included in the first text corpus and a total number of words in the first text corpus and a second ratio of the words commonly included in the second text corpus and a total number of words in the second text corpus being greater than or equal to a threshold value, storing the second word in the memory.

15. The controlling method of claim 11, further comprising:
- clustering the plurality of words included in the pronunciation dictionary into a first group based on pronunciation of each of the plurality of words; and
- partitioning each of a set of words included in the first group to which the first word belongs into a plurality of phonemes.

16. The controlling method of claim 15, further comprising:
- storing the second word in the first group to which the first word belongs,
- wherein the verifying comprises identifying a number of words commonly included in the first text corpus and the second text corpus, and
- wherein the storing comprises storing the second word to the first group to which the first word belongs, based on the number of words.

17. The controlling method of claim 10, further comprising:
- receiving a voice through a microphone; and
- performing voice recognition of the voice based on the pronunciation dictionary including the second word.

18. The controlling method of claim 10, further comprising:
- receiving a voice which is input through a microphone of an external device from the external device; and
- performing voice recognition on the voice based on the pronunciation dictionary including the second word.

19. A non-transitory computer readable medium storing computer instructions executed by a processor of an electronic device to make the electronic device perform operations including:
- obtaining a second word based on a first word from among a plurality of words included in a pronunciation dictionary pre-stored in a memory;
- obtaining a first text corpus related to the first word through web crawling of the first word;
- obtaining a second text corpus related to the second word through web crawling of the second word;
- verifying the second word based on a result of comparison of the first text corpus and the second text corpus; and
- providing the second word to the pronunciation dictionary of the memory based on the verifying.

20. The non-transitory computer readable medium of claim 19, wherein the obtaining the second word based on the first word comprises:
- partitioning the first word into a plurality of phonemes;
- identify an alternate phoneme of a first phoneme included in the plurality of phonemes based on pronunciation of each of the first phoneme and the alternate phoneme;
- replacing the first phoneme with the alternate phoneme; and
- obtaining the second word.

* * * * *